(12) United States Patent
Schmid et al.

(10) Patent No.: US 10,506,016 B2
(45) Date of Patent: Dec. 10, 2019

(54) GRAPH ANALYTIC ENGINE THAT IMPLEMENTS EFFICIENT TRANSPARENT REMOTE ACCESS OVER REPRESENTATIONAL STATE TRANSFER

(71) Applicant: Oracle International Corporation, Redwood Shores, CA (US)

(72) Inventors: Korbinian Schmid, San Mateo, CA (US); Sungpack Hong, Palo Alto, CA (US); Felix Kaser, San Francisco, CA (US); Alexander Weld, Mountain View, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 71 days.

(21) Appl. No.: 15/159,263

(22) Filed: May 19, 2016

(65) Prior Publication Data
US 2017/0339209 A1    Nov. 23, 2017

(51) Int. Cl.
*H04L 29/08*    (2006.01)
*G06F 16/901*    (2019.01)
*H04L 29/06*    (2006.01)

(52) U.S. Cl.
CPC .......... *H04L 67/02* (2013.01); *G06F 16/9024* (2019.01); *H04L 67/04* (2013.01); *H04L 67/2804* (2013.01); *H04L 69/16* (2013.01)

(58) Field of Classification Search
None
See application file for complete search history.

(56) References Cited

U.S. PATENT DOCUMENTS 6,041,306 A    3/2000 Du
7,167,850 B2    1/2007 Stanfill
(Continued)

OTHER PUBLICATIONS

Pey, Larriba, "News and Events—Performance in Action", Management of Mobile Device Data, Sparsity-Technologies, http://sparsity-technologies.com/blog/, last viewed on May 6, 2015, 11 pages.

(Continued)

*Primary Examiner* — Thomas J Dailey
(74) *Attorney, Agent, or Firm* — Hickman Palermo Becker Bingham LLP; Brian N. Miller

(57) ABSTRACT

Techniques herein decouple available results, from graph analysis execution, to adapt to various deployment configurations. In an embodiment, a graph engine is deployed that has multiple mutually-exclusive configuration modes that include being embedded within a software application, centrally serving software applications, or distributed amongst a cluster of computers. Based on a current configuration mode of the graph engine, a software application receives or generates an analysis request to process a graph. The software application provides the analysis request to the graph engine in exchange for access to a computational future, of the graph engine, that is based on the analysis request and the graph. Based on a proxy of said computational future, the software application accesses a result of the analysis request. In an embodiment, a remote proxy exchanges representational state transfer (REST) messages. Network mechanisms, such as transport control protocol (TCP) and hypertext transfer protocol (HTTP), provide enhanced remoting.

18 Claims, 10 Drawing Sheets

(56) References Cited

U.S. PATENT DOCUMENTS

| | | | |
|---|---|---|---|
| 7,322,033 B2 | 1/2008 | Ito | |
| 7,971,194 B1 | 6/2011 | Gilboa | |
| 8,645,429 B1 | 2/2014 | Bik | |
| 8,793,283 B1* | 7/2014 | Austern | G06N 20/00 707/798 |
| 9,182,952 B2 | 11/2015 | Qi | |
| 9,361,154 B2 | 6/2016 | Booman | |
| 9,385,845 B1 | 7/2016 | Austern | |
| 9,477,532 B1 | 10/2016 | Hong | |
| 9,577,911 B1 | 2/2017 | Castleman | |
| 9,652,286 B2 | 5/2017 | Fan | |
| 9,838,242 B2 | 12/2017 | Tully | |
| 9,852,230 B2 | 12/2017 | Fleury | |
| 10,089,761 B2 | 10/2018 | Viswanathan | |
| 2002/0087275 A1 | 7/2002 | Kim | |
| 2002/0129340 A1 | 9/2002 | Tuttle | |
| 2005/0027785 A1* | 2/2005 | Bozak | G06F 9/5072 709/200 |
| 2007/0038987 A1 | 2/2007 | Ohara | |
| 2007/0239694 A1 | 10/2007 | Singh | |
| 2008/0028474 A1 | 1/2008 | Home | |
| 2009/0119641 A1 | 5/2009 | Ramsey | |
| 2009/0235237 A1 | 9/2009 | Song | |
| 2009/0265299 A1* | 10/2009 | Hadad | G06N 5/02 706/55 |
| 2010/0088665 A1 | 4/2010 | Langworthy | |
| 2010/0088666 A1 | 4/2010 | Box | |
| 2010/0144629 A1* | 6/2010 | Beardsley | A61K 8/91 514/21.7 |
| 2010/0281166 A1* | 11/2010 | Buyya | G06F 9/5072 709/226 |
| 2011/0258246 A1* | 10/2011 | Khandekar | G06F 9/5027 709/201 |
| 2011/0307897 A1 | 12/2011 | Atterbury | |
| 2012/0159459 A1 | 6/2012 | Turner | |
| 2012/0188249 A1* | 7/2012 | Kretz | G06N 5/02 345/440 |
| 2012/0222030 A1* | 8/2012 | Goossen | G06F 9/5011 718/100 |
| 2012/0304192 A1 | 11/2012 | Grove | |
| 2013/0013567 A1 | 1/2013 | Constantinescu | |
| 2013/0024479 A1* | 1/2013 | Gong | G06F 9/5066 707/798 |
| 2013/0031550 A1 | 1/2013 | Choudhury | |
| 2013/0046894 A1* | 2/2013 | Said | G06F 9/547 709/226 |
| 2013/0097136 A1 | 4/2013 | Goldberg | |
| 2013/0290282 A1 | 10/2013 | Faerber | |
| 2013/0305095 A1 | 11/2013 | Chishiro | |
| 2014/0108489 A1 | 4/2014 | Glines | |
| 2014/0130056 A1 | 5/2014 | Goodman | |
| 2014/0136555 A1 | 5/2014 | Jacob | |
| 2014/0195518 A1 | 7/2014 | Kelsey | |
| 2014/0215477 A1 | 7/2014 | Chen | |
| 2014/0250041 A1* | 9/2014 | Vigoda | G06F 9/5066 706/46 |
| 2014/0359559 A1 | 12/2014 | Qi | |
| 2015/0007182 A1 | 1/2015 | Rossbach | |
| 2015/0022538 A1 | 1/2015 | Munshi | |
| 2015/0024158 A1 | 1/2015 | Bhargava | |
| 2015/0026158 A1 | 1/2015 | Jin | |
| 2015/0095182 A1 | 4/2015 | Zhou | |
| 2015/0149503 A1 | 5/2015 | Wollrath | |
| 2015/0363476 A1 | 12/2015 | Li | |
| 2015/0378697 A1 | 12/2015 | Sathyananthan | |
| 2016/0063037 A1* | 3/2016 | Savkli | G06F 17/30277 707/722 |
| 2016/0117358 A1 | 4/2016 | Schmid et al. | |
| 2016/0140152 A1 | 5/2016 | Sevenich et al. | |
| 2016/0188391 A1 | 6/2016 | Ekanadham | |
| 2016/0292303 A1 | 10/2016 | Hong | |
| 2017/0032064 A1 | 2/2017 | Walsh | |
| 2017/0124452 A1 | 5/2017 | Tucker | |
| 2017/0168751 A1 | 6/2017 | Stevens | |
| 2018/0039709 A1 | 2/2018 | Chen | |
| 2018/0210761 A1 | 7/2018 | Lee et al. | |

OTHER PUBLICATIONS

Neo4j Graph Database, "What is a Graph Database?", http://neo4j.com/developer/graph-database/, last viewed on May 6, 2015, 7 pages.

Hong et al., "Green-Marl: A DSL for Easy and Efficient Graph Analysis", ASPLOS'12 Mar. 2012, AMC, 14 pages.

Giraph "Introduction to Apache Giraph", http://giraph.apache.org/intro.html, last viewed on May 6, 2015, 2 pages.

Dato.com, "GraphLab Create User Guide", Introduction, 1 page, last viewed on May 6, 2015, 1 page.

Mallette, Stephen, "Mapping a URI to JSON", https://github.com/tinkerpop/rexster/wiki/Mapping-a-URI-to-JSON, dated May 2, 2013, 1 page.

Mallette, Stephen, "Basic REST API", https://github.com/tinkerpop/rexster/wiki/Basic-REST-API, dated May 30, 2013, 4 pages.

U.S. Appl. No. 14/524,838, filed Oct. 27, 2014, Office Action, dated Sep. 28, 2016.

U.S. Appl. No. 14/524,838, filed Oct. 27, 2014, Final Office Action, dated Feb. 9, 2017.

Schmid, U.S. Appl. No. 14/524,838, filed Oct. 27, 2014, Office Action, dated Jun. 12, 2017.

Schmid, U.S. Appl. No. 14/524,838, filed Oct. 27, 2014, Notice of Allowance, dated Dec. 6, 2017.

Schmid, U.S. Appl. No. 14/524,838, filed Oct. 27, 2014, Adviosry Action, dated Apr. 4, 2017.

Lee, U.S. Appl. No. 15/413,811, filed Jan. 24, 2017, Office Action, dated Aug. 8, 2018.

Lee, U.S. Appl. No. 15/413,811, filed Jan. 24, 2017, Interview Summary, dated Oct. 9, 2018.

Xin, et al., "GraphX: Unifying Data-Parallel and Graph-Parallel Analytics", dated Feb. 11, 2014, ACM, 12 pages.

Low et al., "Distributed GraphLab: A Framework for Machine Learning and Data Mining in the Cloud", Proceedings of the VLDB Endowment, vol. 5, No. 8, 12 pages, dated Aug. 27, 2012.

Yuan et al., "PathGrapg: A Path Centric Graph Processing System", IEEE transactions on Parallel and Distributed Systems, vol. 27, No. 10, dated Oct. 10, 2016, 15 pages.

Mccune et al., "Thinking Like a Vertex: A Survery of Vertex-Centric Frameworks for Large-Scale Distributed Graph Processing", ACM Computing Surveys, vol. 48, No. 2, dated Oct. 10, 2016, 39 pages.

\* cited by examiner

GRAPH ANALYTIC ENGINE THAT IMPLEMENTS EFFICIENT TRANSPARENT REMOTE ACCESS OVER REPRESENTATIONAL STATE TRANSFER

FIELD OF THE DISCLOSURE

This disclosure relates to graph analysis request processing. Techniques are presented for efficiently operating a graph analytic engine to achieve transparent remote access over representational state transfer (REST).

BACKGROUND

Graph analysis is a form of data analytics where the underlying dataset is represented as a graph. Graph databases are rapidly emerging to support graph analysis.

In order to process huge data sets that do not fit within the memory of a single computer, academia and industry use distributed graph processing systems. In these systems, graph data is partitioned over multiple computers of a cluster, and the computation is performed in a distributed manner. Several distributed systems for large graph analysis have been developed that emphasize scalability.

A common usage pattern of such systems is a three-step approach:
1. Explore and validate the results of different types of analyses on a small dataset using only a laptop
2. Once a satisfactory analysis result was found, run the analysis chosen in step 1 on a real dataset using a big server-class machine
3. Once the dataset has grown too big and cannot be analyzed on a single machine anymore, distribute the workload over various machines There are several reasons why this three-step approach is so common. Data scientists evaluating different graph analytic systems do not want to go through the process of installing and configuring the system on a server or cluster before they are able to try it out. The very same system should run on a laptop, offering the same functionality, only with worse performance.

Graph analytic systems often offer many variations of the same analysis technique with different precision and performance trade-offs. The most pragmatic way to figure out which variation gives the best result is to try out all of them and compare. If the dataset is really big, this process might be very time consuming. It is easier to run all variations on a much smaller dataset first, which has the same characteristics as the real dataset.

Computation time on big server-class machines or clusters is usually expensive, both from a money and energy perspective. Knowing which analysis gives the best result in advance allows users to plan and therefore use computing time more efficiently.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
 1.0 General Overview
 2.0 Example Computer
  2.1 Example Client
  2.2 Graph Engine
  2.3 Analysis Request Processing
  2.4 Proxy Interface
  2.5 Query Result
 3.0 Example Server
 4.0 Federation
  4.1 Large Graph
  4.2 Graph Partition
  4.3 Vertical Scale
 5.0 Example Process
 6.0 Workload Management
  6.1 Backlog in Work Queue
  6.2 Thread Pool
 7.0 Remoting
  7.1 REST
  7.2 HTTP
  7.3 TCP
 8.0 Paging
  8.1 Remote Proxy
  8.2 LRU Cache
 9.0 Object Properties
  9.1 Vertex
 10.0 Distributed Graph
  10.1 Graph Engine Cache
 11.0 Hardware Overview 1.0 General Overview Techniques are provided for decoupling available results, from graph analysis request execution, to adapt to various deployment configurations. In an embodiment, a graph engine is deployed that has multiple mutually-exclusive configuration modes that include being embedded within a software application, centrally serving software applications, or distributed amongst a cluster of computers. Based on a current configuration mode of the graph engine, a software application receives or generates an analysis request to process a graph. The software application provides the analysis request to the graph engine in exchange for access to a computational future, of the graph engine, that is based on the analysis request and the graph. Based on a proxy of said computational future, the software application accesses a result of the analysis request.

In an embodiment, a remote proxy exchanges representational state transfer (REST) messages. Network mechanisms, such as transport control protocol (TCP) and hypertext transfer protocol (HTTP), facilitate remoting.

2.0 Example Computer

Figure 1A:
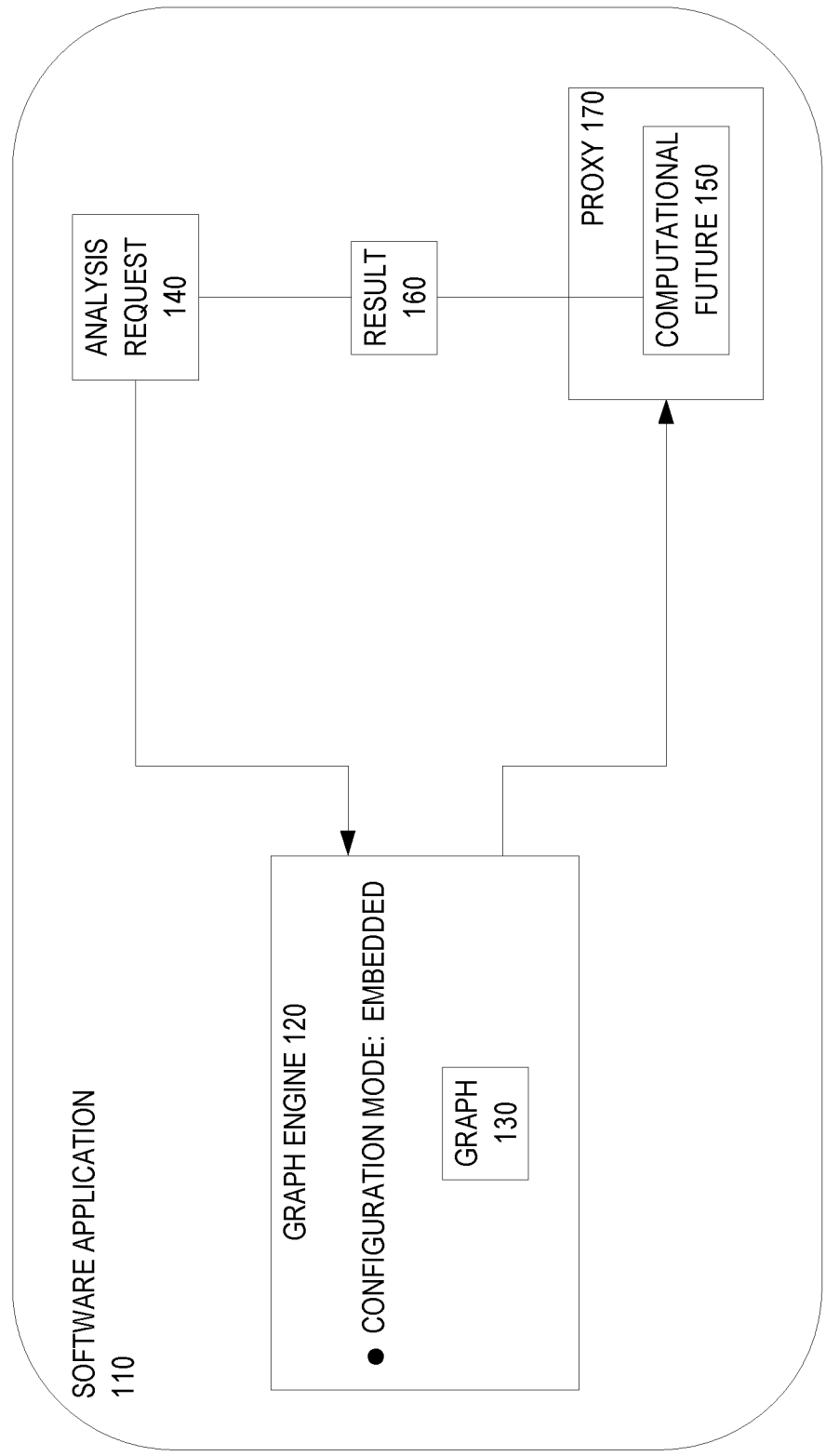
FIG. 1A is a block diagram that depicts a graph engine that is deployed in embedded mode, in an embodiment.
Figure 1B:
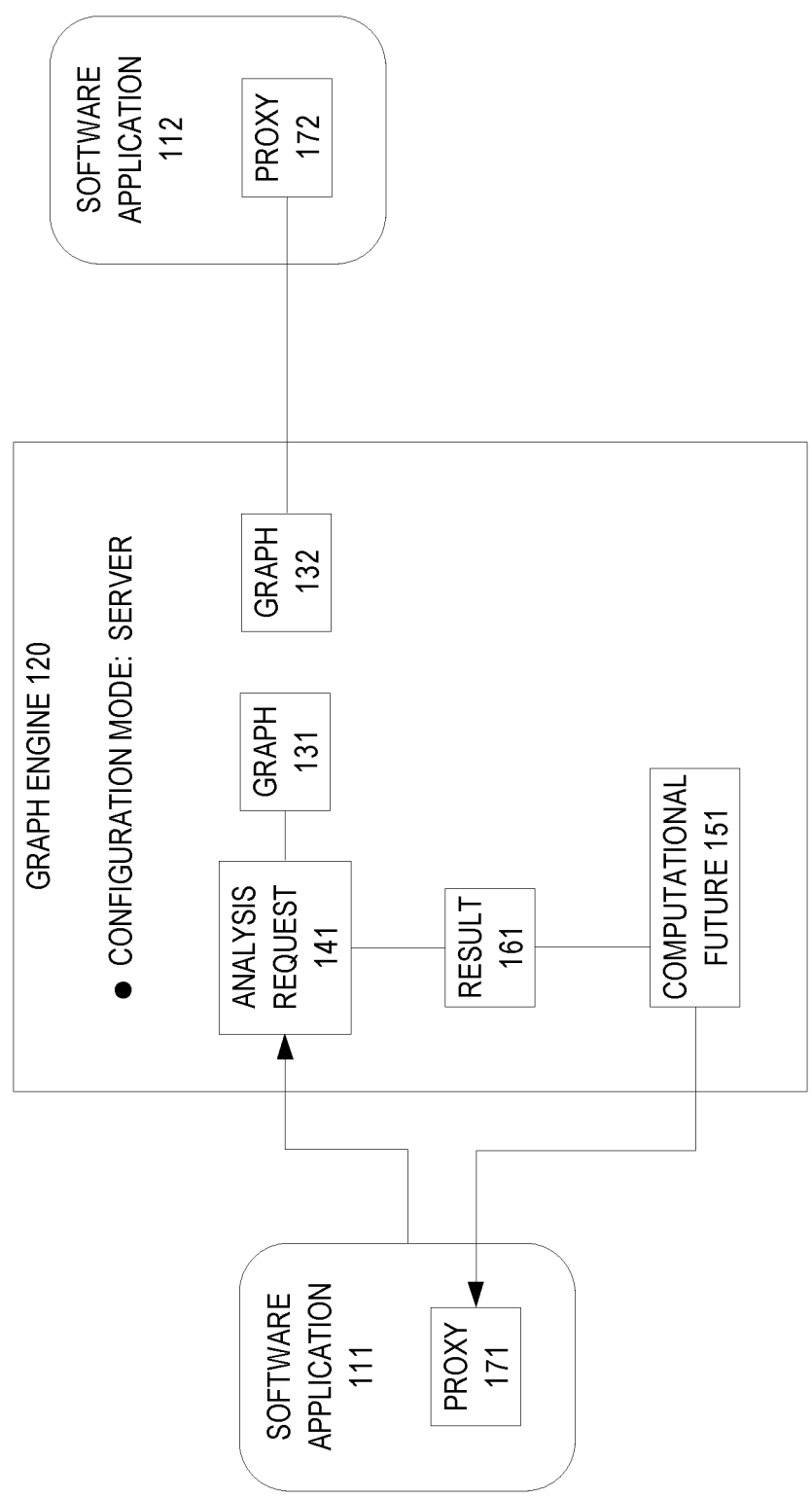
FIG. 1B is a block diagram that depicts a graph engine that is deployed in server mode, in an embodiment.
Figure 1C:
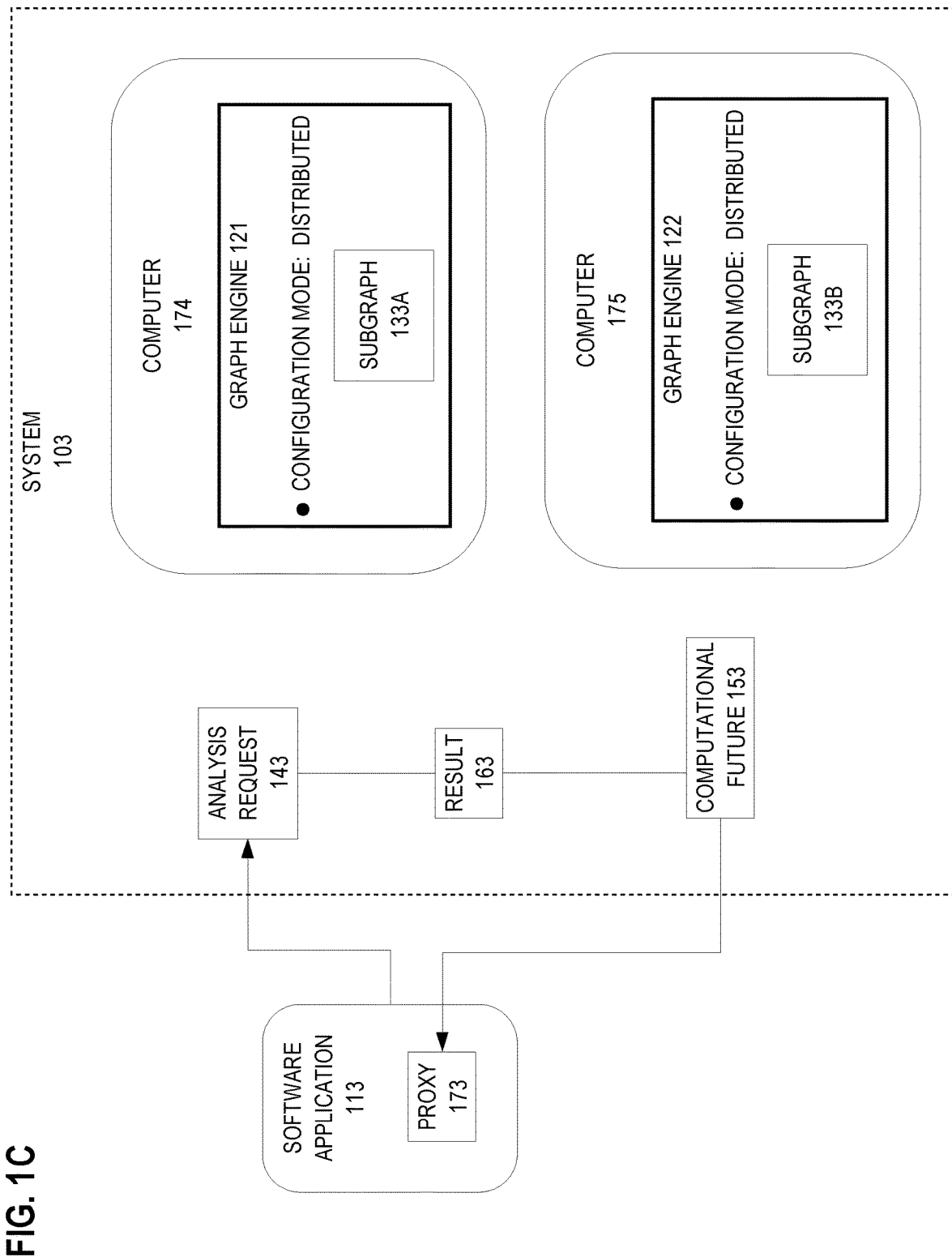
FIG. 1C is a block diagram that depicts a graph engine that is deployed in distributed mode, in an embodiment.

FIGS. 1A-C are block diagrams that depict an example graph engine 120, in an embodiment. Graph engine 120 decouples available results from analysis request execution.

Computer 100 may be a rack server such as a blade, a personal computer, a mainframe, a smartphone, a networked appliance, or other computing device. Computer 100 may access data that is stored in memory and on disks.

2.1 Example Client

Computer 100 hosts software application 110, which uses storage and processing resources of computer 100. Software application 110 may be desktop software, a batch job, a service component, or other computer program.

Software application 110 performs graph analytics, such as traversals and searches for matching vertices, paths, and subgraphs. Software application 110 analyzes logical graph 130 that is composed of vertices interconnected by edges.

2.2 Graph Engine

Software application 110 includes graph engine 120 to automate graph 130. Graph engine 120 may be a reusable container that may host graphs, such as 130. Graph engine 120 provides data structures for vertices and edges. Graph engine 120 may impose (enforce) semantics such as referential integrity, resource description framework (RDF) triples, and other schematic constraints.

Graph engine 120 is a software component that has different configuration modes that adapt the behavior of graph engine 120 to suit a deployment environment. In the embodiment of FIG. 1A, graph engine 120 is configured for embedded configuration mode.

In embedded configuration mode, graph engine 120 is hosted directly within software application 110. In this mode, graph engine 120 and software application 110 may share memory, an address space, a codebase and linker, and an execution context within an operating system.

2.3 Analysis Request Processing

In operation, graph engine 120 interprets and answers analysis requests, such as 140, for information about graph 130. Analysis request 140 may specify patterns to match or other criteria for deriving information from the data of graph 130. Analysis request 140 may transform and filter the data of graph 130, such as by selecting, projecting, and updating.

Analysis request 140 may be encoded according to a query language, a regular expression language, or a general-purpose scripting language. Analysis request 140 may include a procedural or declarative script, a subroutine invocation with arguments, or executable bytecode.

Analysis request 140 may be encoded according to JavaScript, extensible stylesheet language (XSL), standard query language (SQL), a graph query language, or an RDF query language such as SPARQL. Analysis request 140 may conform to a property graph query language such as Cypher or PGQL.

Analysis request 140 may invoke or specify a traversal-based procedural analysis, such as breadth-first search, the PageRank algorithm, or a custom algorithm. A codebase of the algorithm may be contained within analysis request 140, installed with graph engine 120, or otherwise deployed.

In operation, software application 110 submits analysis request 140 to graph engine 120 for processing against graph 130. Graph engine 120 reacts by more or less immediately answering analysis request 140 by providing proxy 170 for later usage by software application 110. Meanwhile in the background, graph engine 120 also executes analysis request 140.

Graph engine 120 may manipulate analysis request 140. For example, graph engine 120 may optimize, compile, or transform analysis request 140 or otherwise react to analysis request 140.

For example, graph engine 120 may syntactically parse and semantically analyze analysis request 140. Graph engine 120 may generate a query plan or other logic for executing analysis request 140.

Graph engine 120 may generate a plan or logic that is tailored for the configuration mode of graph engine 120. Later figures herein present examples of particular architectures for particular configuration modes of graph engine 120.

2.4 Proxy Interface

Proxy 170 is a wrapper object or decorator object that contains, or is associated with, computational future 150. Both of proxy 170 and computational future 150 are data structures.

Proxy 170 may expose an interface of data and behavior that is more or less similar to the interface that is provided by computational future 150. Software application 110 uses proxy 170 as a substitute for computational future 150. Access to computational future 150 by software application 110 may occur through proxy 170.

2.5 Query Result

Computational future 150 is a placeholder or claim check for later accessing result 160, which is the answer to analysis request 140. While graph engine 120 executes analysis request 140, result 160 is unavailable.

Analysis request 140 may take a long time to process if the graph is large or processing analysis request 140 is computationally complex. For example, analysis request 140 may invoke or specify a complicated graph analysis algorithm such as community detection, PageRank, shortest path finding, or link prediction.

While result 160 is unavailable, any attempt to access it via computational future 150 (or indirectly via proxy 170) will either block (suspend execution) or otherwise indicate the unavailability of result 160. Blocking may be achieved with synchronization, coordination, and scheduling primitive operations and constructs such as a mutex or a signal.

Eventually graph engine 120 finishes analysis request 140 and creates result 160. Graph engine 120 unblocks (resumes) any activity that was blocked while waiting for result 160 to become available.

In an embedded embodiment with modern heap automation, software application 110 may hold a weak reference to result 160 that does not prevent garbage collection of result 160. For example, a client may abandon the results of an analysis request. Those results will be garbage collected by graph engine 120.

For example, when graph engine 120 is embedded inside software application 110, the weak reference does not prevent garbage collection of result 160 regardless of whether or not software application 110 mistakenly abandons result 160. In order to prevent leaks by design, graph engine 120 does not surrender responsibility for the memory that it manages.

3.0 Example Server

FIG. 1B again shows graph engine 120. However in this example, graph engine 120 is in server configuration mode to provide graph automation for multiple software applications.

FIG. 1B shows system 101, which includes software applications 111-112 and graph engine 120. System 100 also includes one or more computers.

For example, graph engine 120 may occupy a central computer such as a blade. Each of software applications 111-112 may occupy a separate client computer, such as laptops. All of these computers may intercommunicate over a computer network.

In this example, each proxy is decoupled from its associated computational future. For example, proxy 171 and computational future 151 are related, although they may reside on separate physical or virtual computers or separate operating system processes on a same computer.

Proxy 171 may access computational future 151 according to a distributed integration idiom such as a remote procedure call. For example, proxy 171 may communicate according to hypertext transfer protocol (HTTP), simple object access protocol (SOAP), remote method invocation (RMI), extensible markup language (XML), or JavaScript object notation (JSON).

Graph engine 120 may host separate graphs 131-132 for separate software applications. Alternatively, multiple software applications may simultaneously or sequentially issue similar or distinct queries that interrogate a same shared graph that is hosted by graph engine 120.

4.0 Federation

FIG. 1C again shows graph engine 120. However in this example, graph engine 120 exists as a pair of graph engines 121-122 that are in distributed configuration mode for horizontal scaling.

FIG. 1C shows system 103 that includes computers 174-175, which may be peers in a cluster. For example, computers 174-175 may be blades on a rack and arranged into a Beowulf cluster.

Alternatively, computers 174-175 are virtual machines within an elastic cloud. For example, computers 174-175 may be included amongst a hundred participating peers.

4.1 Large Graph

This configuration mode may host the largest graphs, such as 133, which are those with the most vertices and edges. For example, graph 133 may have billions of vertices.

Graph 133 may be too large to store at a single computer. Graph 133 may be too large to timely process on a single computer.

4.2 Graph Partition

Instead, graph 133 is divided into partitions, such as subgraphs 133A-B. Each subgraph may be stored on a separate computer. For example, computer 174 contains subgraph 133A.

The operational data structures, such as computational future 153 and query result 163, along with query planning, may occupy a central computer, although not shown. Software application 113 may reside on a client computer.

System 103 may decompose analysis request 143 into subqueries for separate execution on computers 174-175. System 103 may aggregate results from computers 174-175 to synthesize result 163.

4.3 Vertical Scale

The configuration modes of FIGS. 1A-C, along with implementations and techniques, are further explained with later figures herein. Graph engine 120 is more or less identical across FIGS. 1A-C, except that the configuration mode is switched to suit the deployment environment of each of FIGS. 1A-C.

In this way, graph engine 120 is a graph container that may be adjusted for reuse in different contexts. Each of these contexts may support a particular scenario, such as a software development lifecycle (SDLC) phase such as developer unit testing, system integration testing, and production release. As such, switching between configuration modes of graph engine 120 may be related to vertical scale.

5.0 Example Process

Figure 2:
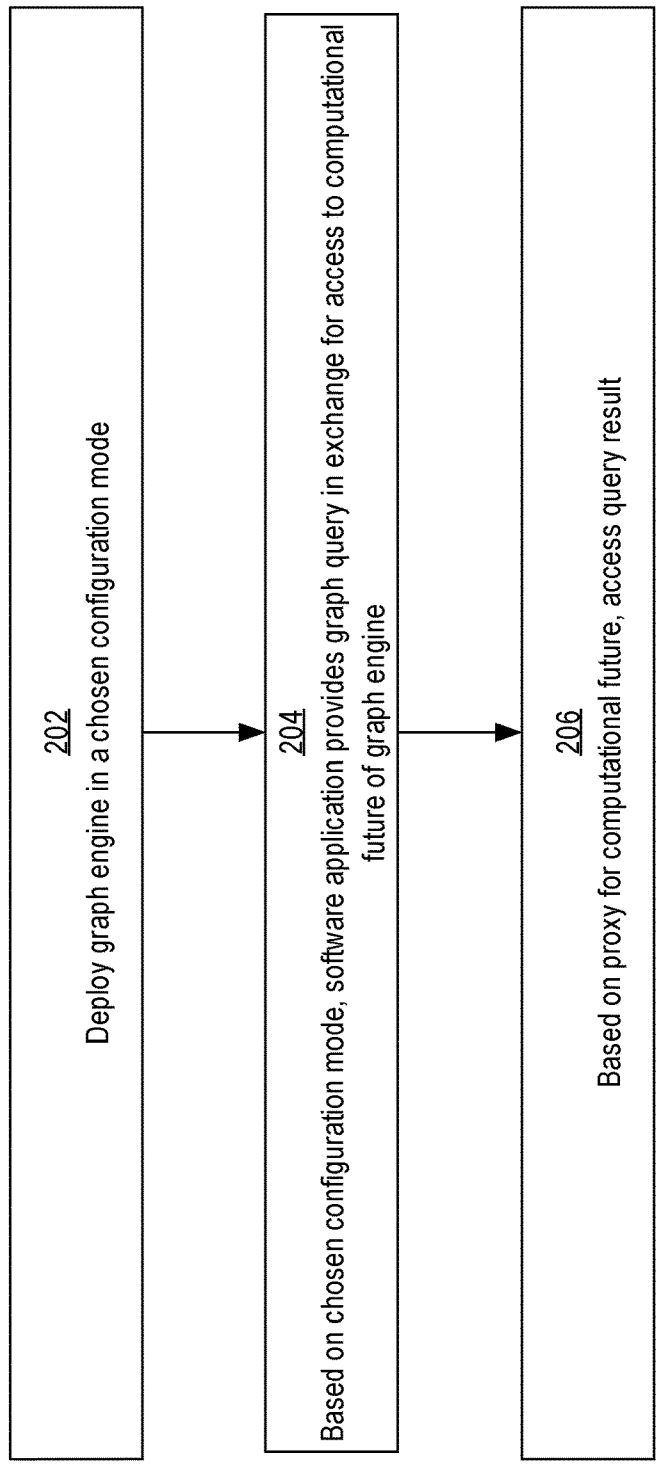
FIG. 2 is a flow diagram that depicts an example process for decoupling available results, from graph analysis request execution, to adapt to various deployment configurations, in an embodiment.

FIG. 2 is a flow diagram that depicts an example graph infrastructure process that decouples available results, from query execution, to adapt to various deployment configurations. FIG. 2 is discussed with reference to FIGS. 1A-C.

Step 202 is preparatory. A graph engine deploys in a chosen configuration mode.

For example, graph engine 120 may treat FIGS. 1A-C as mutually exclusive deployment options for separate scenarios or environments. For example, graph engine 120 may be used by a graphical user interface (GUI), such as an application of a smartphone.

If the data of graph 130 is fully resident on the smartphone, then graph engine 120 may also operate while the smartphone lacks Internet access. For example, graph 130 may be a mature (read only) or learning neural network of neurons (vertices) and connections (edges) between them.

A smartphone application, such as 110, may have a neural network for deep learning of user habit or preference. For example, all of the edge weights of the neural network may reside within the smartphone.

This local data typically needs less infrastructure than remote data. For example, local data access may not need HTTP. For a GUI, less infrastructural overhead tends to achieve lower latency, a livelier feel, and less strain.

Such efficiency is achieved by the embedded deployment configuration of graph engine 120, which is suited for desktop, mobile, real time, and Internet of Things (IoT) applications. The architecture of the embedded configuration is lean. Direct containment of graph engine 120 within software application 110 is an adaptation that reduces the transactional (operational) latency of embedded configuration.

Step 204 is operational. Based on the chosen configuration mode, the software application provides a graph query in exchange for access to computational future of the graph engine.

For example, software application 110 receives or generates query 140. Software application 110 may then submit query 140 by invoking a subroutine of graph engine 120.

Graph engine 120 may spawn computational threads to execute query 140, such as for a multicore processor Graph engine 120 creates computational future 150 to track the progress of the computational threads and the readiness of result 160.

In step 206 the software application uses a proxy for the computational future to access the query result. The proxy is based on a computational future for the query result.

However for example, graph engine 120 does not directly expose result 160 or computational future 150. Instead, computational future 150 is bound to proxy 170, such as by containment nesting as with objects that envelope or otherwise wrap other objects or by object decoration that otherwise associates one object with another.

In embodiments, weaving aspects or Java annotations may decorate an object. For example, proxy 170 may depend upon an implementation of java.lang.annotation.Annotation.

Methods of proxy 170 may be bound to invoke methods of computational future 150. Likewise, computational future 150 may or may not be bound to result 160. In a Java embodiment, proxy 170 may be created by a factory such as java.lang.reflect.Proxy, and computational future 150 may be an instance of java.util.concurrent.Future.

Graph engine 120 may answer query 140 by returning proxy 170 by value or by reference. Software application 110 may use proxy 170 as if it were computational future 150.

6.0 Workload Management

Figure 3:
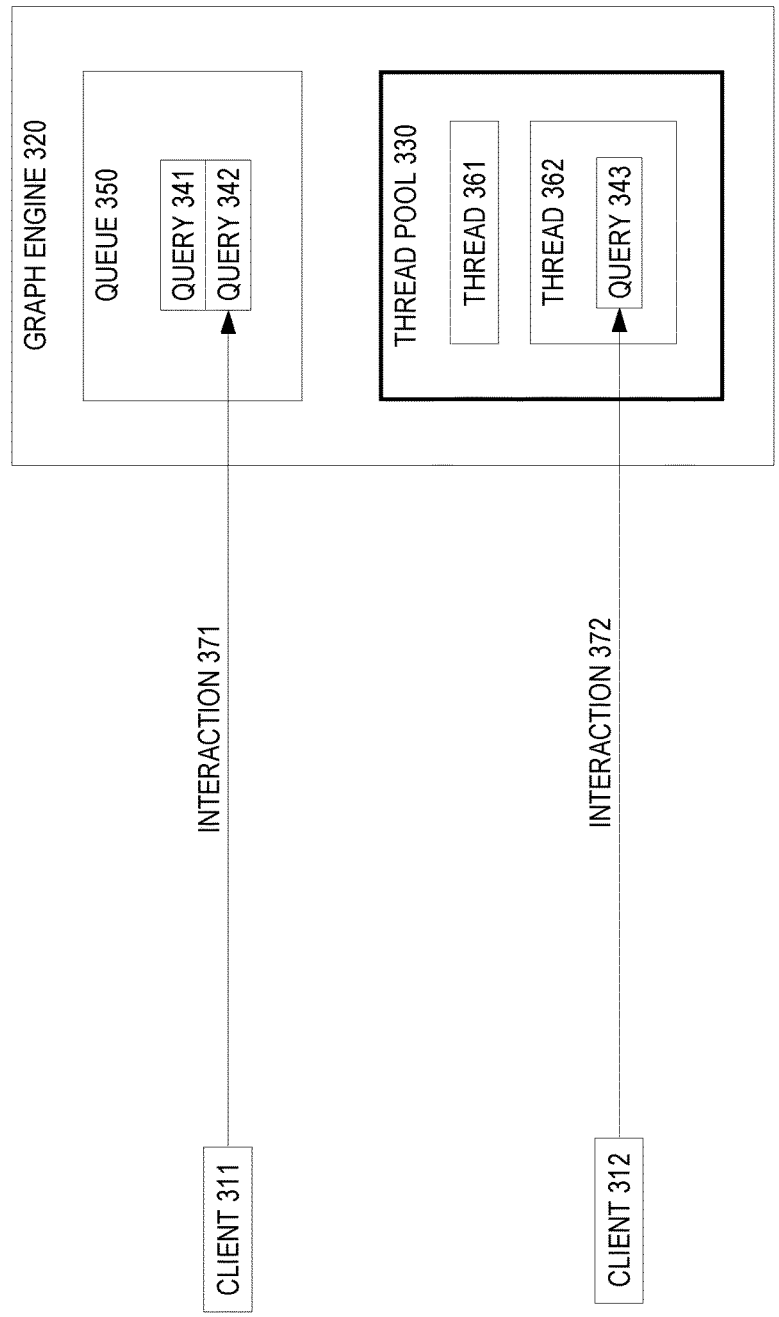
FIG. 3 is a block diagram that depicts an example system that manages its workload, in an embodiment.

FIG. 3 is a block diagram that depicts an example system 300 that has mechanisms and techniques to manage its workload, in an embodiment. System 300 contains graph engine 320 and clients 311-312. Graph engine 320 may be an embodiment of graph engine 120.

In an embodiment, each of graph engine 320 and clients 311-312 occupies a separate computer. In an embodiment, graph engine 320 and clients 311-312 occupy a same computer.

Clients 311-312 may be client applications or client computers. Clients 311-312 formulate and submit queries, such as 341-342, to graph engine 320 for processing.

6.1 Backlog in Work Queue

For example, interaction 371 may show that client 311 submits query 342 to graph engine 320. Graph engine 320 contains queue 350 to store pending queries, such as 341-342. Queue 350 may absorb a demand spike by converting it into a backlog of work.

FIG. 3 illustrates multiple example scenarios. The content and meaning of interactions 371-372 depend on which scenario is involved.

When client 311 submits query 342, then interaction 371 represents the submission of query 342. However, client 311 may continue to interact with query 342 after query 342 has been submitted and appended to queue 350 for deferred processing.

Client 311 may cancel query 342 while query 342 waits in queue 350. For example, interaction 371 may be a cancellation of query 342 sent by client 311. Graph engine 320 may respond to the cancellation by removing query 342 from queue 350 and discarding query 342 without processing it.

6.2 Thread Pool

Graph engine 320 has thread pool 330 to clear the work backlog of queue 350. Thread pool 330 has execution threads, such as 361-362, which may each process one query from queue 350 at a time.

In an embodiment such as multicore, one query may simultaneously use multiple threads from thread pool 330. In an embodiment, graph engine 320 may dynamically adjust how many threads run a given query. For example, thread pool 330 may be over-utilized during a demand spike from many queries.

During the spike, graph engine 320 may decide to initially process a query with only one thread. Whereas after the spike subsides, the query may be given additional threads. However, the following explanation assumes one thread per query.

Thread pool 330 may occupy a computer that has multiple processing cores. For example, graph engine 320 may occupy a computer that uses a multicore central processing unit (CPU) that performs symmetric multiprocessing (SMP).

Thread pool 330 may have an amount of threads that is configured to match an amount of processing cores of the computer. For example, the computer may have a dual-core CPU, and thread pool 330 may be configured with two threads, such as 361-362, which may each be assigned a respective processing core.

Each of threads 361-362 may simultaneously process a respective query. For example, thread 361 may process query 342 at the same time that thread 362 processes query 343.

Client 312 may interact with graph engine 320 while thread 362 executes query 343. For example, interaction 372 may show that client 312 sends a status inquiry to a computational future within graph engine 320 that tracks the completion of query 343.

In another example, interaction 372 may show that client 312 sends a cancellation to query 343. Thread 362 may interrupt and abandon query 343 if interaction 372 is a cancellation.

7.0 Remoting

Figure 4:
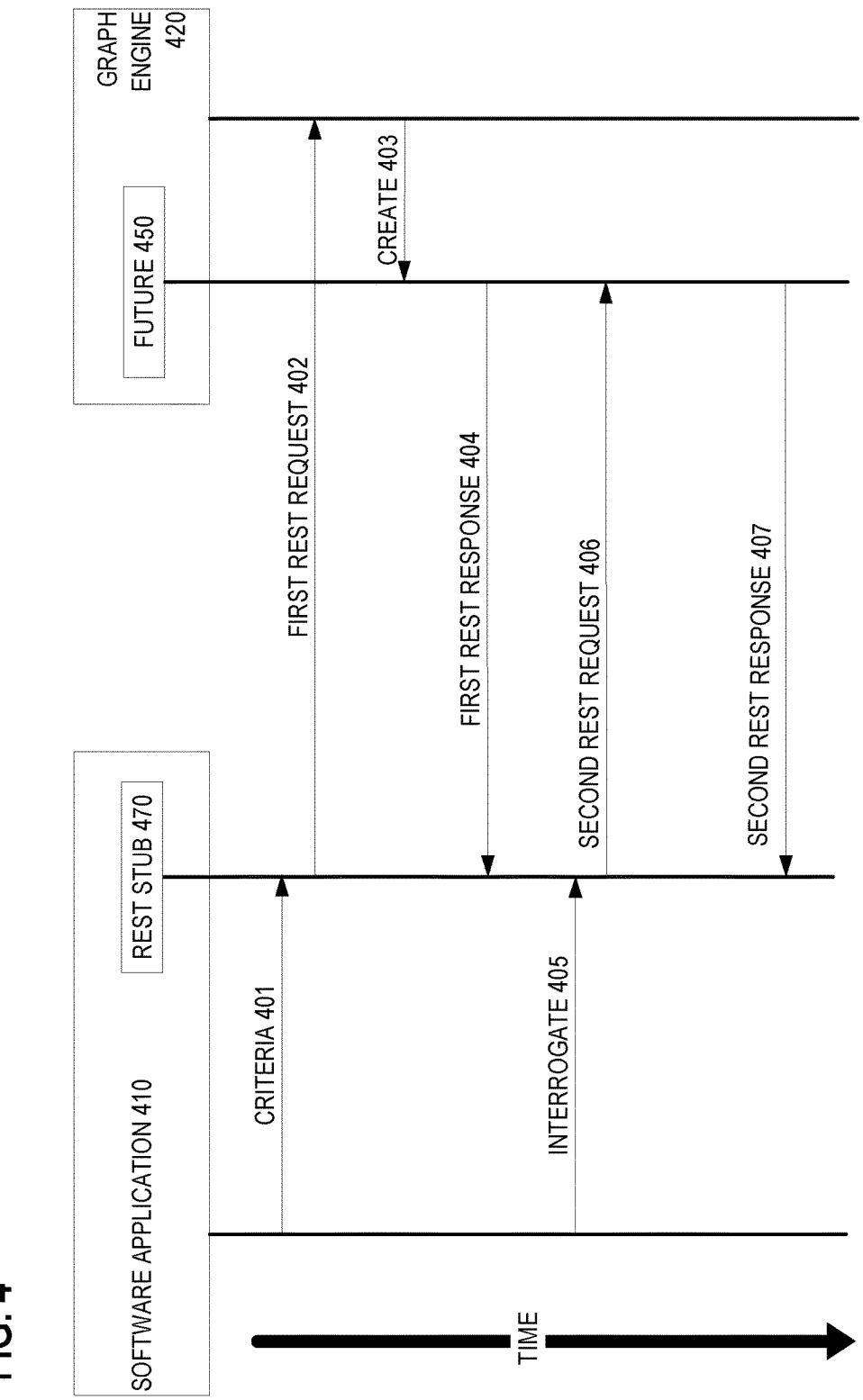
FIG. 4 is a scenario diagram that depicts interactions in an example system that uses representational state transfer (REST) for remoting, in an embodiment.

FIG. 4 is a scenario diagram that depicts interactions within an example remoting system 400 that uses representational state transfer (REST) for remoting, in an embodiment. Remoting system 400 contains graph engine 420 and software application 410. Graph engine 420 may be an embodiment of graph engine 120.

Remoting system 400 may be distributed such that graph engine 420 occupies one computer, while software application 410 occupies another computer. For example, the computers may be connected by a computer network through which interactions between software application 410 and graph engine 420 pass as REST messages.

Alternatively, the separation of software application 410 and graph engine 420 may be a logical separation instead of a physical separation. For example, software application 410 and graph engine 420 may occupy separate virtual machines of a same physical computer, occupy separate computer programs of a same computer, or occupy a same computer program.

7.1 Rest

FIG. 4 is a scenario diagram that depicts interactions within an example remoting system 400 that uses representational state transfer (REST) for within remoting system 400, interactions between components are shown as horizontal arrows. For example, software application 410 formulates a graph query that includes criteria for pattern matching. Shown as criteria 401, software application 410 transfers the query or its criteria to REST stub 470.

Software application 410 contains REST stub 470, which translates internal interactions, such as criteria 401, into REST messages for sending to graph engine 420. In an embodiment, REST stub 470 is a monolithic proxy that mediates all interactions between software application 410 and graph engine 420.

In an embodiment, REST stub 470 is a collection of fine-grained proxies, where each proxy mediates interactions against a particular component within graph engine 420. For example, there may be one proxy in software application 410 for each computational future in graph engine 420.

Time flows downward, as shown by the bold arrow pointing downward. For example, criteria 401 occurs before first REST request 402.

7.2 HTTP

In response to receiving criteria 401, REST stub 470 sends first REST request 402 to graph engine 420. First REST request 402 may be an HTTP request with a uniform resource locator (URL) and an HTTP verb that are meaningful to graph engine 420.

For example a query interaction, such as 402, may be transferred as an HTTP Post, Get, or Put request to an URL such as "http://computer/queryPath?originVertex=5&targetVertex=3". Whereas, a cancellation interaction that identifies a particular query may be transferred as an HTTP Delete request to an URL such as "http://computer/cancel?query=4".

Graph engine 420 may react to first REST request 402 by creating (shown as create 403) computational future 450 and transmitting future 450 back to REST stub 470. For example, graph engine 420 may transfer first REST response 404 as an HTTP response that includes an identifier of future 450.

REST stub 470 need not expose the identifier of future 450 to software application 410. For example, REST stub 470 may instead expose a reference to a proxy that encapsulates (hides) the identifier of future 450.

Software application 410 may attempt to determine the readiness or result of future 450 by sending interrogate 405 to REST stub 470. REST stub 470 may react by transferring second REST request 406 that bears the identifier of future 450.

If graph engine 420 has already completely processed the graph query of first rest request 402, then graph engine 420 and future 450 have the result of the query. For example if the result is already available, then future 450 may answer second REST request 406 by immediately sending the result within second REST response 407.

7.3 TCP

However, the query result might not be ready when graph engine 420 receives second REST request 406 to access the result. In an embodiment, REST interactions such as 402, 404, and 406-407 are transferred over a transport control protocol (TCP) connection.

Software application 410 and graph engine 420 may keep the TCP connection alive even though the desired query result is unready (still being calculated). For example, future 450 need not immediately respond to second REST request 406 and may keep the TCP connection alive at least until the query result is ready, at which time the query result may be sent as part of second REST response 407. This technique of keeping a lingering TCP connection in anticipation of an eventual condition is known as long polling.

Furthermore if a TCP connection lingers long enough without transferring an HTTP response to an outstanding HTTP request, then the connection may time out. In an embodiment, an HTTP Keep-Alive header establishes an HTTP timeout and maximum request retries. In an embodiment, a TCP keepalive timer detects a connection loss, perhaps caused by a crash or reboot of either endpoint, and retransmits accordingly.

For example, interactions 405-406 block while waiting for the result of a query. Interactions 405-406 may block (be suspended) because second REST request 406 was made synchronously and second REST response 407 has not yet occurred.

At this moment, a connection timeout may occur or a retransmission may be needed. In an embodiment, either of client components 410 and 470 may detect a broken connection and reconnect. In an embodiment, either of client components 410 and 470 may resend second REST request 406 if a prior sending was unanswered for too long.

7.4 Error

REST stub 470 may throw an exception that is based on transport data. For example, REST stub 470 may inspect an HTTP header, a SOAP envelope, or other transport status to detect an error.

REST stub 470 may throw a particular type of exception based on details of an HTTP status code or a SOAP fault. For example, REST response 404 or 407 may bear a 400-series or 500-series HTTP status code. REST stub 470 may detect this error condition and throw an appropriate exception.

When a server error occurs, the content body of an HTTP response may be repurposed for bearing error details. For example, the content body may bear JSON data that encodes details that that may guide REST stub 470 with issues such as whether or not the stub should throw an exception, which exception, and with what error message.

8.0 Paging

Figure 5:
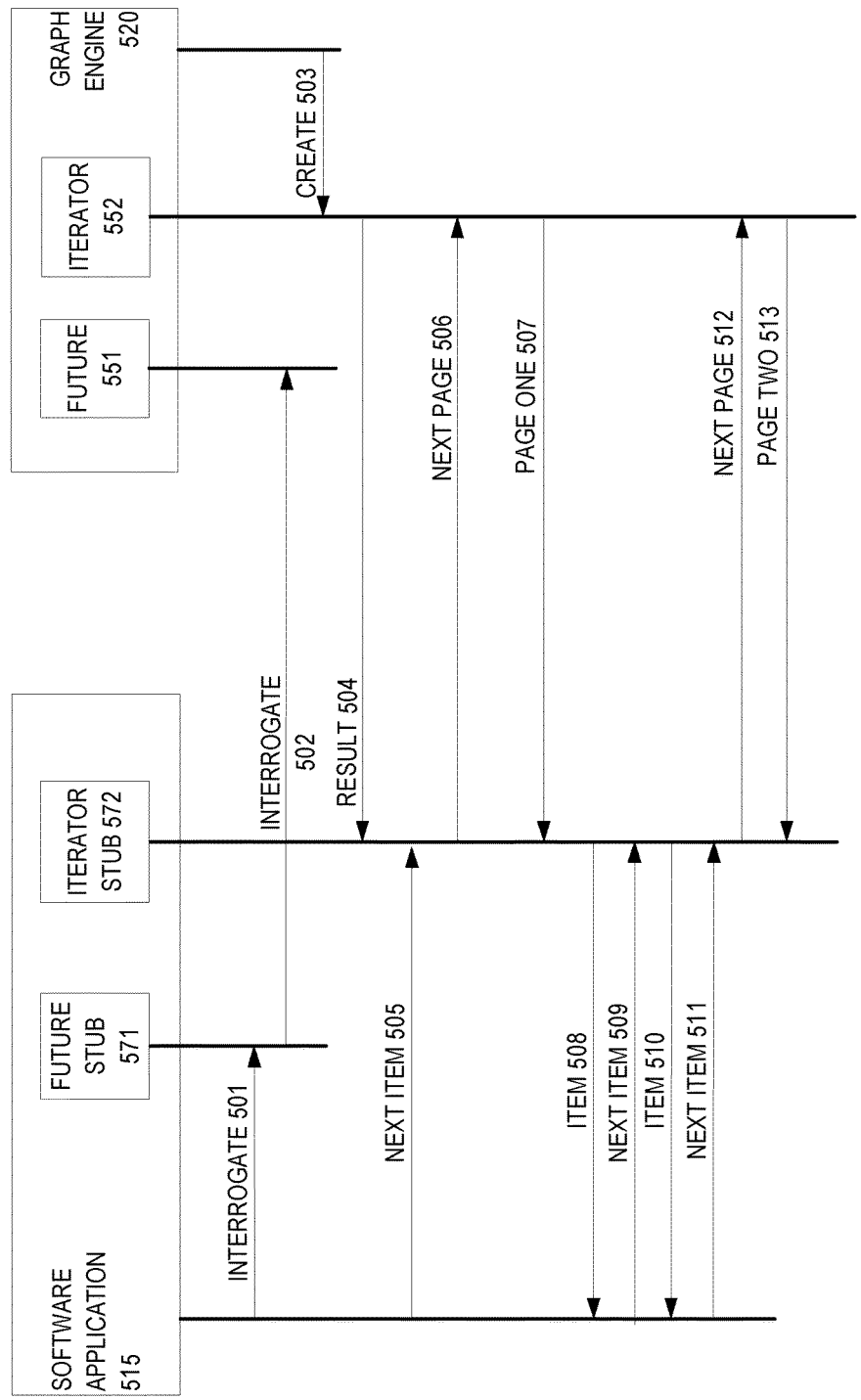
FIG. 5 is a scenario diagram that depicts interactions between computers within an example system that reduces latency by delivering data in coarse-grained chunks, in an embodiment.

FIG. 5 is a scenario diagram that depicts example interactions within an example paging system 500 that reduces latency by delivering data in coarse-grained chunks, in an embodiment. Paging system 500 contains software application 515 and graph engine 520. Graph engine 520 may be an implementation of graph engine 120.

Software application 515 contains future stub 571, which is a proxy for future 551 in graph engine 520. Whether future stub 571 operates as a remote proxy or a local proxy depends on which configuration mode does graph engine 520. For example if graph engine 520 is in embedded configuration mode, then future stub 571 is a local proxy.

Software application 515 may use future stub 571 to access the result of a query, shown as interrogates 501-502. Meanwhile, graph engine 520 still processes the query, including creating iterator 552 to contain the results of the query. For example, the results may have thousands of vertices that matched the query.

It does not matter which of interactions 502-503 occurs first. Eventually the query result, iterator 552, and future 551 are ready.

An identifier of iterator 552 is sent back to software application 515, shown as result 504. This causes software application 515 to create or configure iterator stub 572 with the identifier of iterator 552.

8.1 Remote Proxy

Iterator stub 572 is a proxy for iterator 552. Iterator stub 572 is also a smart stub. Its communication is shaped to reduce latency by consolidating data access activity.

Iterator stub 572 may provide access to the vertices of the query result, one vertex at a time. One-by-one access performs well when graph engine 520 is configured for embedded mode.

However in other configuration modes, when iterator stub 572 is a remote proxy such as a REST stub, then each individual vertex access may entail a network round trip, which is high latency. For example, interrogate 502 and result 504 may occur as REST messages over a network or internetwork.

Even though software application 515 accesses vertices one by one, iterator stub 572 may fetch vertices in batches (chunks). For example, iterator stub 572 may fetch vertices two by two, thereby expending half as many round trips.

For example, software application 515 may ask for one vertex, shown as next item 505. Whereas, iterator stub 572 reacts by fetching a page (batch) of vertices, shown as paging 506-507.

8.2 LRU Cache

Iterator stub 572 may have a least-recently used (LRU) cache that stores recent pages of fetched data. Access to other vertices of a same cached page occurs without latency because the network is not involved. For example, next item 505 involves a network round trip, but next item 509 does not and instead hits the cache.

Eventually a cache miss may occur, and another page of vertices may be needed. For example, next item 511 causes paging 512-513.

Software application 515 may use iterator stub 572 to inform graph engine 520 that iterator 552 is no longer needed. Graph engine 520 may use reference counting to detect when a result object, such as iterator 552, should be released, freed, reclaimed, garbage collected, recycled, or otherwise disposed.

9.0 Object Properties

Figure 6:
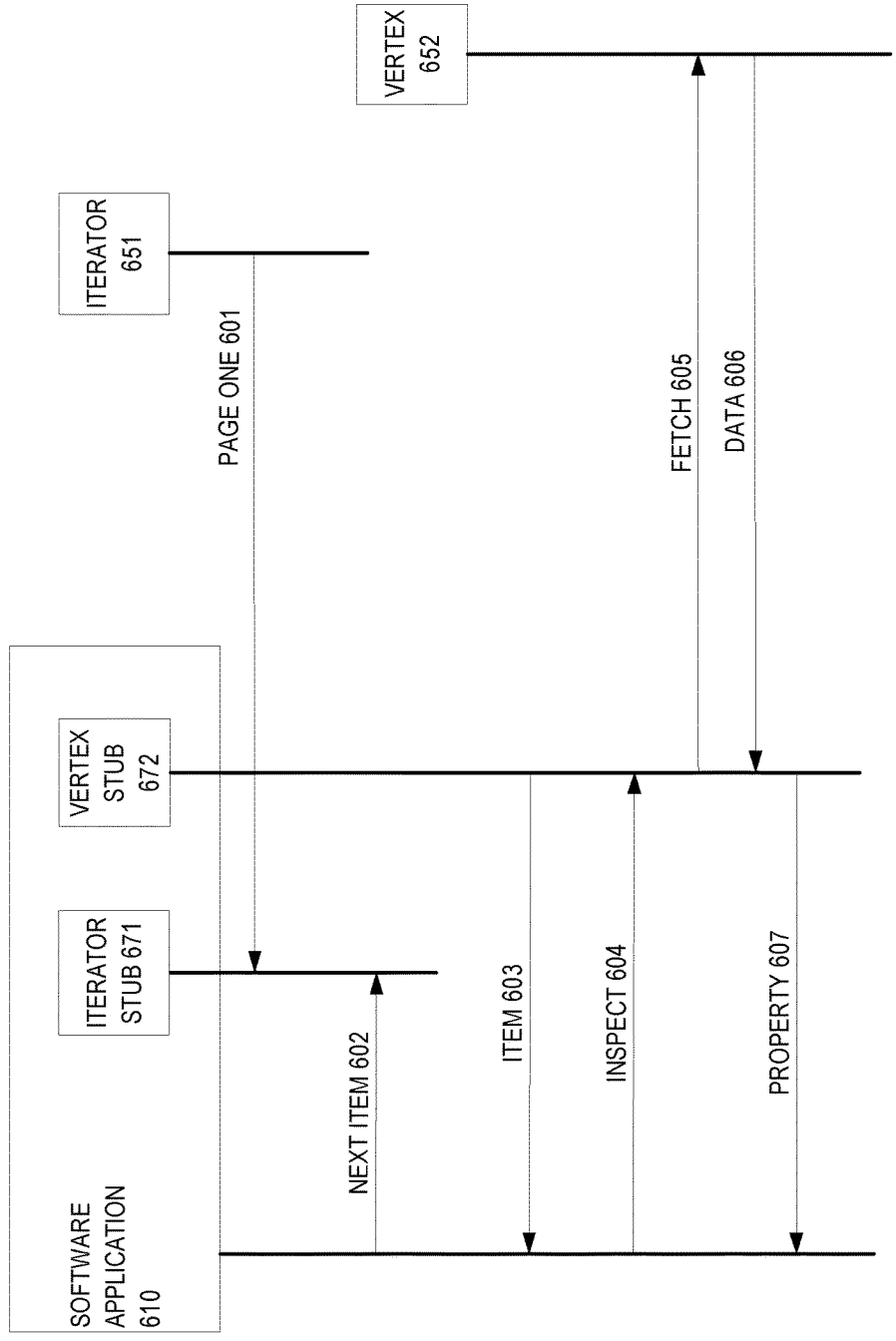
FIG. 6 is a scenario diagram that depicts interactions between computers within an example system that exposes graph object properties, in an embodiment.

FIG. 6 is a scenario diagram that depicts example interactions within an example remoting system 600 that exposes graph object properties, in an embodiment. Remoting system 600 contains software application 610 and a graph engine, such as those already discussed herein.

Software application 610 contains iterator stub 671, which is a proxy for iterator 651 of the graph engine. Iterator stub 671 already caches a page of identifiers of vertices.

9.1 Vertex

Software application 610 may create an individual proxy for any vertex that iterator stub 671 has an identifier for. For example, software application 610 may request a next vertex, shown as next item 602.

Next item 602 may cause creation of vertex stub 672, which is a proxy for vertex 652, and shown as item 603. Software application 610 may use vertex stub 672 to access vertex 652.

For example, vertex 652 may expose multiple data properties that are individually accessible. For example, inspect 604 may be a request to access a particular property of vertex 652.

Vertex stub 672 may have a cache of individual properties or of whole vertices. For example if inspect 604 causes a cache miss, then fetch 605 may request vertex 652 or its particular property.

For example, many or all of the data properties of vertex 652 may be stored into the cache, shown as data 606. Whichever particular property was requested by inspect 604 may be returned from cache as property 607. Access of a subsequent property of vertex 652 may be answered directly from cache.

10.0 Distributed Graph

Figure 7:
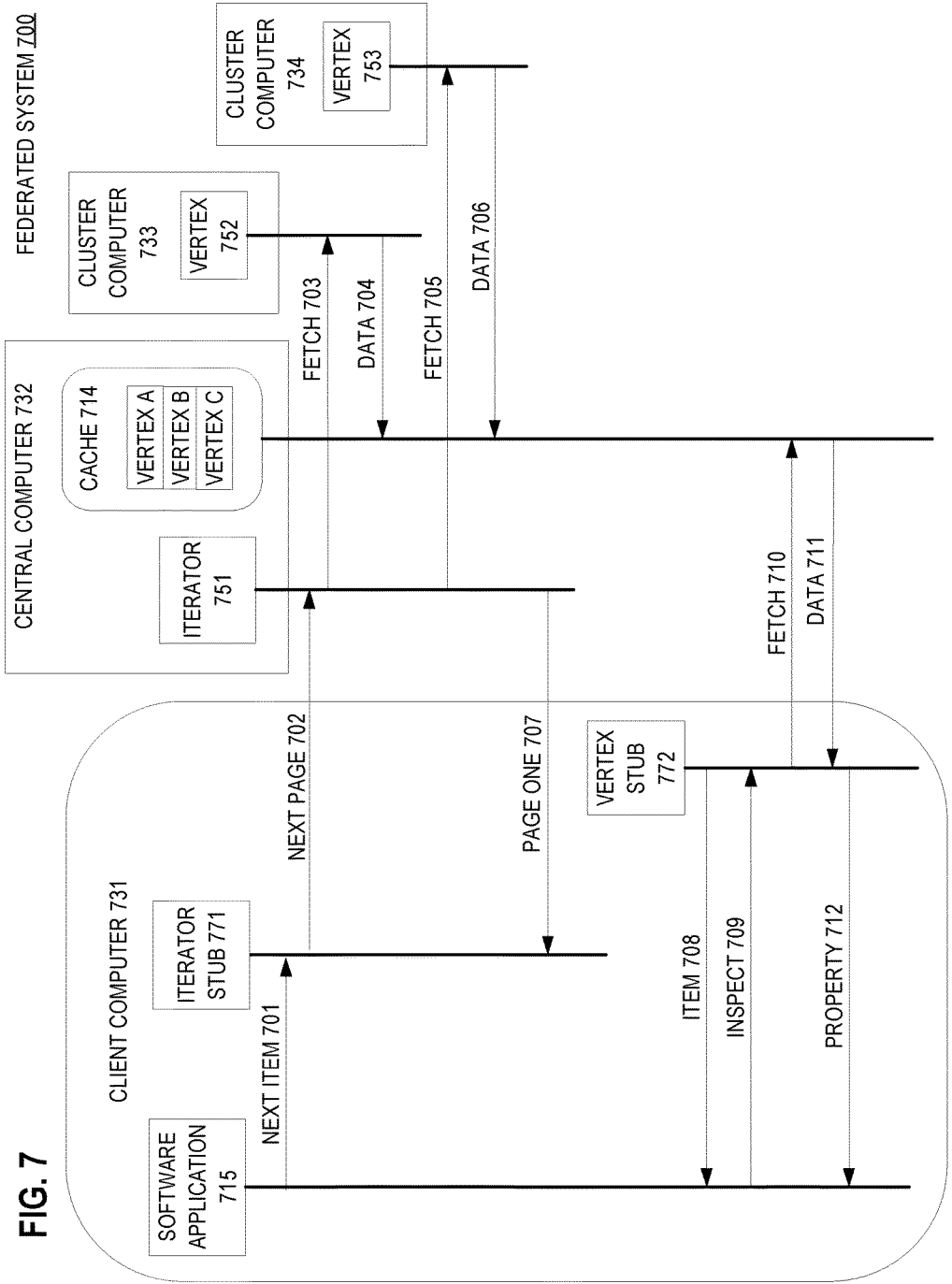
FIG. 7 is a scenario diagram that depicts interactions between computers within an example system that exposes a distributed graph, in an embodiment.

FIG. 7 is a scenario diagram that depicts example interactions within an example federated system 700 that exposes a distributed graph, in an embodiment. Federated system 700 contains computers 731-734.

The vertices of the distributed graph reside on cluster computers, such as 733-734. Cluster computers 733-734 contain a graph engine that is configured in distributed mode.

Central computer 732 operates as a facade for the distributed graph. All client access to the graph may be mediated by central computer 732.

Central computer 732 may referentially aggregate the vertices or other graph data of cluster computers 733-734. For example, central computer 732 may contain iterator 751 that answers a query by gathering matching vertices that are distributed across cluster computers 733-734.

10.1 Graph Engine Cache

Vertices may be gathered by reference or value. References (identifiers) and values may be cached in LRU cache 714. In an embodiment, graph engine cache 714 is an HTTP client cache, such as a web-browser content cache.

For example, iterator 751 may refer to vertices 752-753 that respectively occupy cluster computers 733-734. Iterator 751 may access the contents of graph engine cache 714.

Graph engine cache 714 may warm up by filling itself with one page of vertices at a time. For example, software application 715 may invoke next item 701 to fetch a vertex for inspection.

This may cause iterator stub 771 to fetch next page 702 of vertices, which includes at least vertices 752-753, which occupy separate computers. Fetch next page 702 may cause a miss by graph engine cache 714.

To fill a missing page into graph engine cache 714, iterator 751 may fetch vertex data from both of cluster computers 733-734, shown as fetches 703 and 705. Data 704 and 706 may be object or property data of vertices 752-753.

This data may be stored into graph engine cache 714 and announced by page one 707. However, the data is not actually received by client computer 731 until data 711, which answers an inspection of object properties, shown as interactions 708-710.

For example, software application 715 inspects property 712, which entailed warming up graph engine cache 714 and accessing data on at least one cluster computer, such as 733-734. With graph engine cache 714 now warm, multiple client requests for vertex data, such as fetch 710, may be satisfied by the contents of graph engine cache 714.

11.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
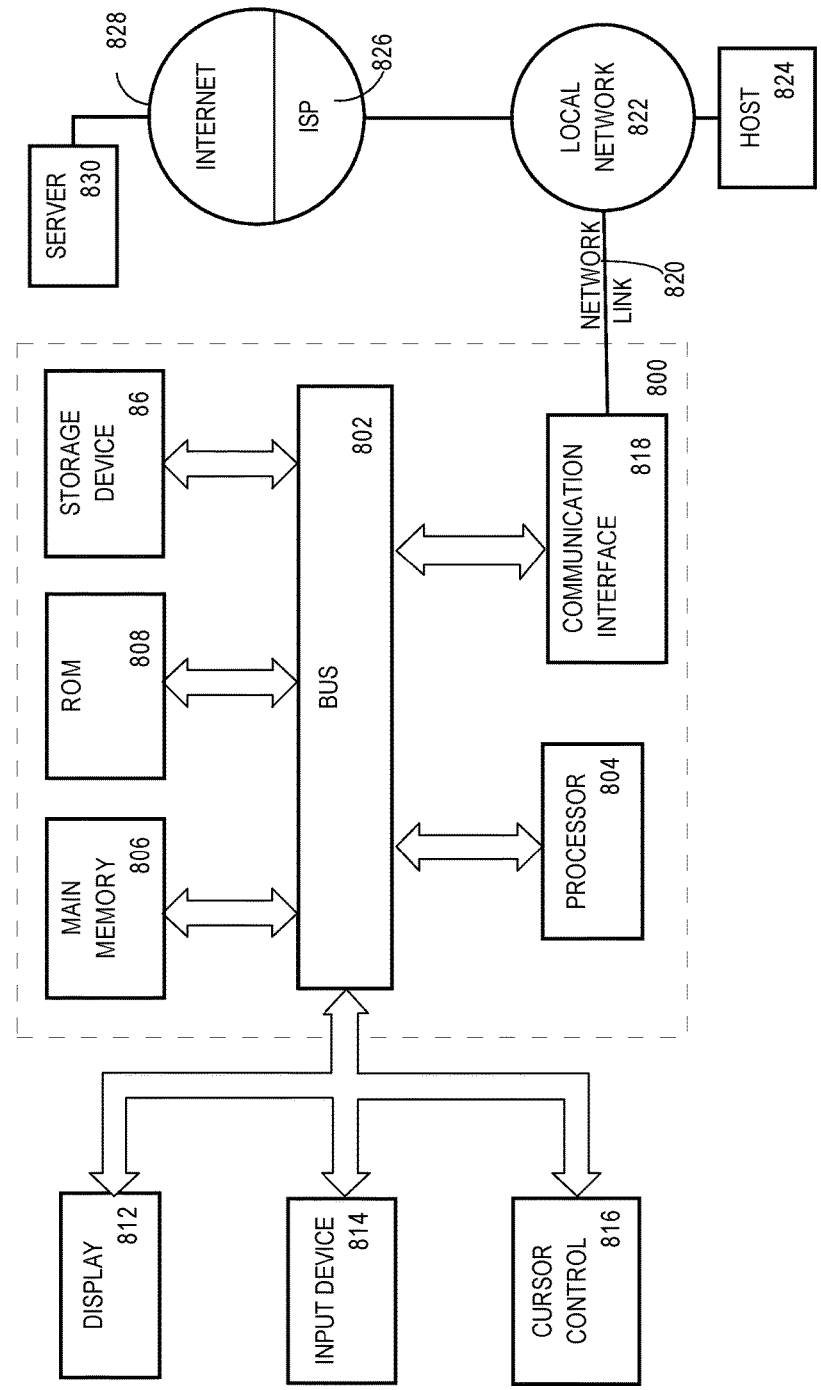
FIG. 8 is a block diagram that illustrates a computer system upon which an embodiment of the invention may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 86, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 86. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 86. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 86 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 86, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    deploying a graph engine that has at least two separate configuration modes of: embedded within a software application on a single client computer, a single computer centrally serving a plurality of remote software applications, or distributed amongst a plurality of computers;
    based on a current configuration mode of said graph engine, a client providing an analysis request, to generate a combined result that contains a plurality of data items of a graph, in exchange for access to a computational future, of said graph engine, that is based on said analysis request and said graph;

said client using said computational future to receive a remote proxy of an iterator of the plurality of data items of said combined result;

said remote proxy sending, to said graph engine, an iteration request that identifies said iterator of the plurality of data items of said combined result;

said graph engine sending, to said remote proxy, a response that contains a fixed amount of said plurality of data items of the combined result for said client, wherein said fixed amount exceeds one.

2. The method of claim 1 wherein:

said current configuration mode is one of: a single computer centrally serving a plurality of remote software applications or distributed amongst a plurality of computers;

providing said analysis request comprises said remote proxy sending a first representational state transfer (REST) request that contains said analysis request;

using said computational future comprises said remote proxy sending a second REST request that identifies said computational future.

3. The method of claim 2 wherein:

sending a second REST request comprises sending an HTTP request over a transport control protocol (TCP) connection;

sending a second REST response comprises:

said graph engine preserving said TCP connection while said computational future is unready;

sending an HTTP response over said TCP connection.

4. The method of claim 2 wherein sending said second REST request times out, and said remote proxy automatically resends said second REST request.

5. The method of claim 2 further comprising:

sending a second REST response that comprises an HTTP status code that indicates an error;

in response to using said remote proxy, throwing an exception based on said HTTP status code.

6. The method of claim 1 wherein:

said current configuration mode is embedded within a software application on a single client computer;

said graph engine comprises a weak reference to said iterator that does not prevent reclamation of said iterator.

7. The method of claim 6 wherein:

said current configuration mode is one of a single computer centrally serving a plurality of remote software applications or distributed amongst a plurality of computers;

the method further comprises:

said software application notifying said graph engine that said software application no longer needs said iterator, and said graph engine disposing said iterator.

8. The method of claim 1 wherein:

the method further comprises said software application exchanging a second analysis request to process said graph in exchange for a second computational future of said graph engine;

said second analysis request identifies said iterator of the plurality of data items of said combined result.

9. The method of claim 1 further comprising said graph engine cancelling an analysis request in response to receiving a cancellation request that identifies said analysis request.

10. The method of claim 1 wherein:

said analysis request comprises a graph query or an analysis script;

the method further comprises said graph engine compiling, based on said current configuration mode, and executing said analysis request.

11. The method of claim 1 further comprising a software application of said plurality of remote software applications invoking at least one analysis of: community detection, PageRank, or shortest path finding.

12. The method of claim 1 wherein:

exchanging said analysis request in exchange for said computational future comprises said graph engine appending said analysis request onto a queue;

the method further comprises said graph engine removing said analysis request from said queue for execution by a thread of a thread pool.

13. The method of claim 1 wherein:

said current configuration mode is one of: a single computer centrally serving a plurality of remote software applications or distributed amongst a plurality of computers;

the method further comprises a second software application exchanging a second analysis request to process said graph in exchange for a second computational future of said graph engine;

said computational future and said second computational future are unready at a same time.

14. One or more non-transitory computer-readable media storing instructions that, when executed by one or more processors, cause:

deploying a graph engine that has at least two separate configuration modes of: embedded within a software application on a single client computer, a single computer centrally serving a plurality of remote software applications, or distributed amongst a plurality of computers;

based on a current configuration mode of said graph engine, a client providing an analysis request, to generate a combined result that contains a plurality of data items of a graph, in exchange for access to a computational future, of said graph engine, that is based on said analysis request and said graph;

said client using said computational future to receive a remote proxy of an iterator of the plurality of data items of said combined result;

said remote proxy sending, to said graph engine, an iteration request that identifies said iterator of the plurality of data items of said combined result;

said graph engine sending, to said remote proxy, a response that contains a fixed amount of said plurality of data items of the combined result for said client, wherein said fixed amount exceeds one.

15. The one or more non-transitory computer-readable media of claim 14 wherein:

said current configuration mode is one of: a single computer centrally serving a plurality of remote software applications or distributed amongst a plurality of computers;

providing said analysis request comprises said remote proxy sending a first representational state transfer (REST) request that contains said analysis request;

using said computational future comprises said remote proxy sending a second REST request that identifies said computational future.

16. The one or more non-transitory computer-readable media of claim 14 wherein
said graph engine comprises a weak reference to said iterator that does not prevent reclamation of said iterator.

17. The one or more non-transitory computer-readable media of claim 14 wherein:
the instructions further cause said software application exchanging a second analysis request to process said graph in exchange for a second computational future of said graph engine;
said second analysis request identifies said iterator of the plurality of data items of said combined result.

18. The one or more non-transitory computer-readable media of claim 14 wherein:
said current configuration mode is one of: a single computer centrally serving a plurality of remote software applications or distributed amongst a plurality of computers;
the instructions further cause a second software application exchanging a second analysis request to process said graph in exchange for a second computational future of said graph engine;
said computational future and said second computational future are unready at a same time.

\* \* \* \* \*